(12) United States Patent
Zou

(10) Patent No.: US 12,277,393 B2
(45) Date of Patent: Apr. 15, 2025

(54) METHOD OF TRAINING RANKING MODEL, AND ELECTRONIC DEVICE

(71) Applicant: BAIDU ONLINE NETWORK TECHNOLOGY (BEIJING) CO., LTD., Beijing (CN)

(72) Inventor: Lixin Zou, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 17/915,161

(22) PCT Filed: Mar. 9, 2022

(86) PCT No.: PCT/CN2022/080007
§ 371 (c)(1),
(2) Date: Sep. 28, 2022

(87) PCT Pub. No.: WO2023/010847
PCT Pub. Date: Feb. 9, 2023

(65) Prior Publication Data
US 2024/0211692 A1    Jun. 27, 2024

(30) Foreign Application Priority Data

Aug. 4, 2021   (CN) .......................... 202110893524.8

(51) Int. Cl.
*G06F 40/284*   (2020.01)
*G06F 40/30*    (2020.01)
*G06N 20/00*    (2019.01)

(52) U.S. Cl.
CPC ............ *G06F 40/30* (2020.01); *G06F 40/284* (2020.01)

(58) Field of Classification Search
CPC ...... G06F 40/30; G06F 40/284; G06F 16/313; G06F 16/3347; G06F 16/338;
(Continued)

(56) References Cited

U.S. PATENT DOCUMENTS

| | | | |
|---|---|---|---|
| 2015/0261745 A1* | 9/2015 | Song | G06F 40/56 704/9 |
| 2017/0364586 A1* | 12/2017 | Krishnamurthy | G06F 16/3329 |
| 2022/0222289 A1* | 7/2022 | Srinivasan | G06F 16/24578 |

FOREIGN PATENT DOCUMENTS

| | | |
|---|---|---|
| CN | 105930314 | 9/2016 |
| CN | 112100529 | 12/2020 |

(Continued)

OTHER PUBLICATIONS

International Search Report and Written Opinion issued in corresponding POT Patent Application No. PCT/CN2022/080007, dated May 20, 2022.

(Continued)

*Primary Examiner* — Paras D Shah
*Assistant Examiner* — Mulugeta Tuji Dugda
(74) *Attorney, Agent, or Firm* — Pillsbury Winthrop Shaw Pittman, LLP

(57) ABSTRACT

A method of training a ranking model, and an electronic device, which relate to technical fields of natural language processing and intelligent search. The method includes: in training the ranking model, firstly acquiring a plurality of first sample pairs and respective label information; for each first sample pair, inputting a first search text, a first title text of a first candidate text, and a first target summary corresponding to the first candidate text into an initial language model to obtain a second relevance score corresponding to the each first sample pair; then using the first target summary to replace the first candidate text to participate in the training of the ranking model, and updating at least one network (Continued)

parameter of the initial language model according to the label information and the second relevance score corresponding to each first sample pair.

20 Claims, 8 Drawing Sheets

(58) Field of Classification Search
CPC ............ G06F 18/2113; G06F 16/3329; G06F 18/214; Y02D 10/00; G06N 20/00
See application file for complete search history.

(56) References Cited

FOREIGN PATENT DOCUMENTS

| | | | | |
|---|---|---|---|---|
| CN | 112100529 A | * | 12/2020 | ........... G06F 16/953 |
| CN | 112328783 | | 2/2021 | |
| CN | 112560496 | | 3/2021 | |
| CN | 112988969 | | 6/2021 | |
| CN | 112988969 A | * | 6/2021 | ......... G06F 16/3344 |
| CN | 113590796 | | 11/2021 | |
| JP | 3909225 B2 | * | 4/2007 | ........... G06F 40/284 |

OTHER PUBLICATIONS

Extended European search report issued in European Patent Application No. 22773577.6, dated Aug. 22, 2023.
Office Action issued in Japanese Patent Application No. 2022-559445, dated Oct. 3, 2023.

* cited by examiner

METHOD OF TRAINING RANKING MODEL, AND ELECTRONIC DEVICE

This application is the U.S. national phase entry of PCT Patent Application No. PCT/CN2022/080007 filed on Mar. 9, 2022, which claims priority to Chinese Patent Application No. 202110893524.8, entitled "METHOD AND APPARATUS OF TRAINING RANKING MODEL, AND ELECTRONIC DEVICE" filed on Aug. 4, 2021, which is incorporated herein by reference in its entirety.

TECHNICAL FIELD

The present disclosure relates to a field of a computer technology, in particular to a method of training a ranking model, and an electronic device, which may be specifically applied in technical fields such as natural language processing and intelligent search.

BACKGROUND

Search engine is an indispensable tool for acquiring information in today's world. In a large-scale industrial search engine scenario, an accurate ranking of candidate texts recalled based on a search content plays a vital role in meeting user's search need and improving user's search experience.

In a related art, ranking of candidate texts recalled based on a search content is generally performed by a pretrained language model (PLM)-based ranking model. However, a ranking performance improvement of the PLM-based ranking model comes at the cost of efficiency, especially when the candidate texts have long content, performance of the existing ranking models may be seriously affected, which results in a low ranking efficiency of candidate texts.

SUMMARY

The present disclosure provides a method of training a ranking model, and an electronic device.

According to an aspect of the present disclosure, a method of training a ranking model is provided, including: acquiring a plurality of first sample pairs and respective label information for the plurality of first sample pairs, wherein each of the first sample pairs includes a first search text and a first candidate text corresponding to the first search text, and the label information describes a first relevance score between the first search text and the first candidate text; for each first sample pair of the plurality of first sample pairs, determining a first target summary corresponding to the first candidate text in the each first sample pair, and inputting the first search text, a first title text of the first candidate text, and the first target summary into an initial language model to obtain a second relevance score corresponding to the each first sample pair; and updating at least one network parameter of the initial language model according to the first relevance score and the second relevance score corresponding to each first sample pair.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method of training the ranking model described in the above aspect.

According to another aspect of the present disclosure, a non-transitory computer-readable storage medium having computer instructions therein is provided, and the computer instructions are configured to cause a computer to implement the method of training the ranking model described in the above aspect.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure.

DETAILED DESCRIPTION OF EMBODIMENTS

Figure 1:
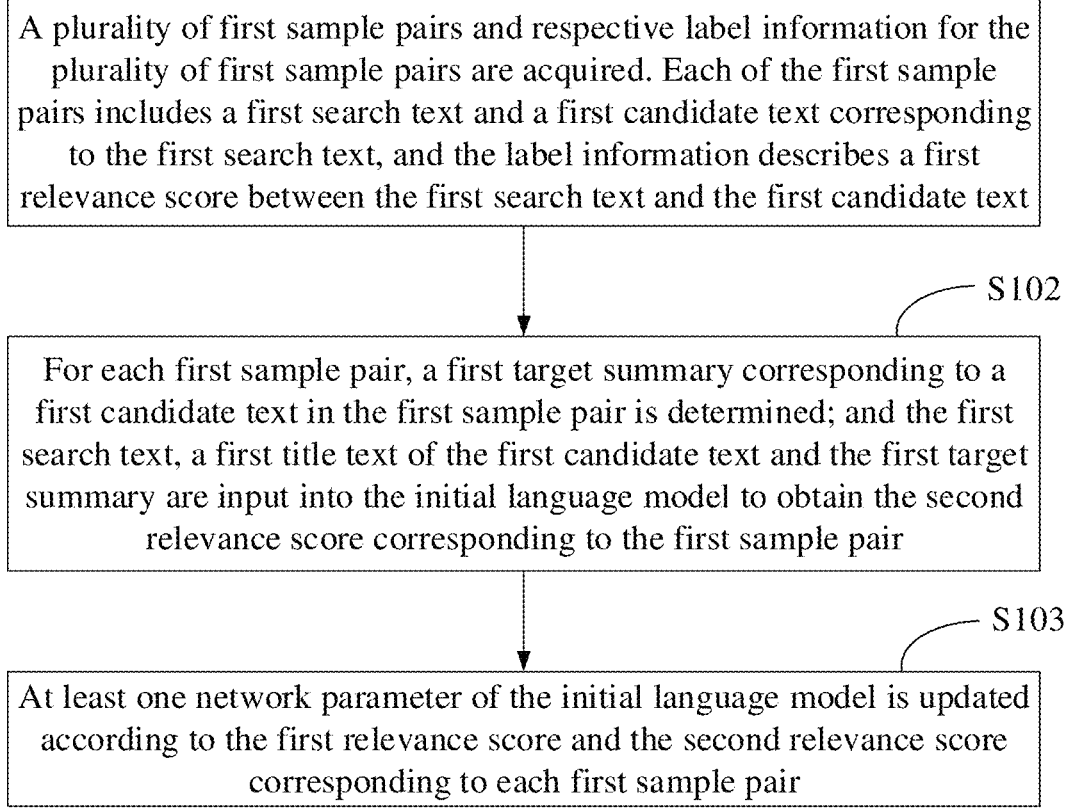
FIG. 1 shows a flowchart of a method of training a ranking model according to a first embodiment of the present disclosure.

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

In embodiments of the present disclosure, "at least one" refers to one or more, and "a plurality of" refers to two or more. The expression "and/or" herein describes an association relationship of associated objects, which means that there may be three relationships. For example, A and/or B may refer to only A, A and B, or only B, where A and B may be singular or plural. In a textual description of the present disclosure, a symbol "/" herein generally indicates an "or" relationship of associated objects. In addition, in embodiments of the present disclosure, "first", "second", "third", "fourth", "fifth" and "sixth" are only for the purpose of distinguishing different objects, and have no other special meanings.

The technical solution provided by embodiments of the present disclosure may be applied to a scenario of a search engine. Especially in a large-scale industrial search engine scenario, a plurality of candidate texts may be recalled based on a search content. Generally, in order to meet user's search need and improve user experience, a candidate text with a high relevance to the search content may be preferentially displayed on a display page according to a relevance between the candidate texts and the search content, so that the user's search need may be met and the user's search experience may be improved.

Therefore, how to accurately rank the candidate texts recalled based on the search content and preferentially display the candidate text with a high relevance to the search content on the display page is very important. In a related art, a PLM-based ranking model is generally used to accurately rank candidate texts recalled based on a search content. However, when the PLM-based ranking model ranks the recalled candidate texts, a consumption of computing resources is directly proportional to the square of a total length of the search content and the candidate texts. Especially when the candidate texts have long content, a large amount of computing resources may be occupied, and a performance of the existing ranking model may be seriously affected, which result in a low ranking efficiency of candidate texts.

In order to solve the problem of poor performance of the ranking model due to the occupation of a large amount of computing resources and thus improve the ranking efficiency of candidate texts, considering that a candidate text generally contains a plurality of contents and different parts of contents may be adapted to different search requirements, a summary corresponding to a candidate text may be determined firstly in order to balance the performance and ranking efficiency of the ranking model. When acquiring the pretrained language model-based ranking model, the summary instead of an entire candidate text may participate in the training of the ranking model, and the ranking model may be trained based on the search text, a title text of the candidate text, and the summary corresponding to the candidate text. Compared with the related art, the consumption of computing resources may be greatly reduced, and the problem of poor performance of the ranking model due to the occupation of a large amount of computing resources may be solved, so that the ranking efficiency of candidate texts may be improved.

Based on the above technical concept, embodiments of the present disclosure provide a method of training a ranking model, which will be described below in detail through specific embodiments. It may be understood that the following several specific embodiments may be combined with each other, and the same or similar concepts or processes may not be repeated in some embodiments.

First Embodiment

FIG. 1 shows a flowchart of a method of training a ranking model according to the first embodiment of the present disclosure. The method of training the ranking model may be performed by software and/or hardware device, and the hardware device may be, for example, a terminal or a server. For example, as shown in FIG. 1, the method of training the ranking model may include the following steps.

In S101, a plurality of first sample pairs and respective label information for the plurality of first sample pairs are acquired. Each of the first sample pairs includes a first search text and a first candidate text corresponding to the first search text, and the label information describes a first relevance score between the first search text and the first candidate text.

In general, the higher the relevance score, the stronger the relevance between the search text and the candidate text; on the contrary, the lower the relevance score, the weaker the relevance between the search text and the candidate text.

For example, the first search text may be "development history of ranking model", or "network architecture and overview of pretrained language model", etc., which may be set according to actual needs. Here, the content of the first search text is not further limited in embodiments of the present disclosure.

Based on the input first search text, a plurality of candidate texts corresponding to the first search text may be recalled accordingly. Different candidate texts may have different relevance scores to the first search text. In embodiments of the present disclosure, the first candidate text corresponding to the first search text included in each first sample pair may be any one of the plurality of candidate texts corresponding to the first search text, and is not limited to a candidate text with a high relevance score to the first search text, as long as the first relevance score between the first search text and the first candidate text is marked by the label information for the first sample pair.

For example, when acquiring the plurality of first sample pairs, a plurality of pre-stored first sample pairs may be directly acquired from a database; or a plurality of first sample pairs may be acquired from a third-party training system; or a plurality of first sample pairs may be acquired by other methods, which may be set according to actual needs. Here, the method of acquiring the plurality of first sample pairs is not specifically limited in embodiments of the present disclosure.

In addition to acquiring the plurality of first sample pairs, it is also needed to acquire a label information corresponding to each first sample pair of the plurality of first sample pairs as a supervision information of the first sample pair for training the ranking model. For example, when acquiring the label information corresponding to each first sample pair, a tree model with a relevance score annotation ability may be pre-trained, and each first sample pair may be directly input into the tree model, then the label information corresponding to the each first sample pair may be acquired through an output of the tree model; or a classification model with a relevance score annotation ability may be pre-trained, and each first sample pair may be directly input into the classification model, then the label information corresponding to the each first sample pair may be acquired through an output of the classification model. The label information corresponding to each first sample pair may also be acquired by other methods, such as a manual annotation, which may be specifically set according to actual needs. Here, the method of acquiring the label information corresponding to each first sample pair is not specifically limited in embodiments of the present disclosure.

Figure 2:
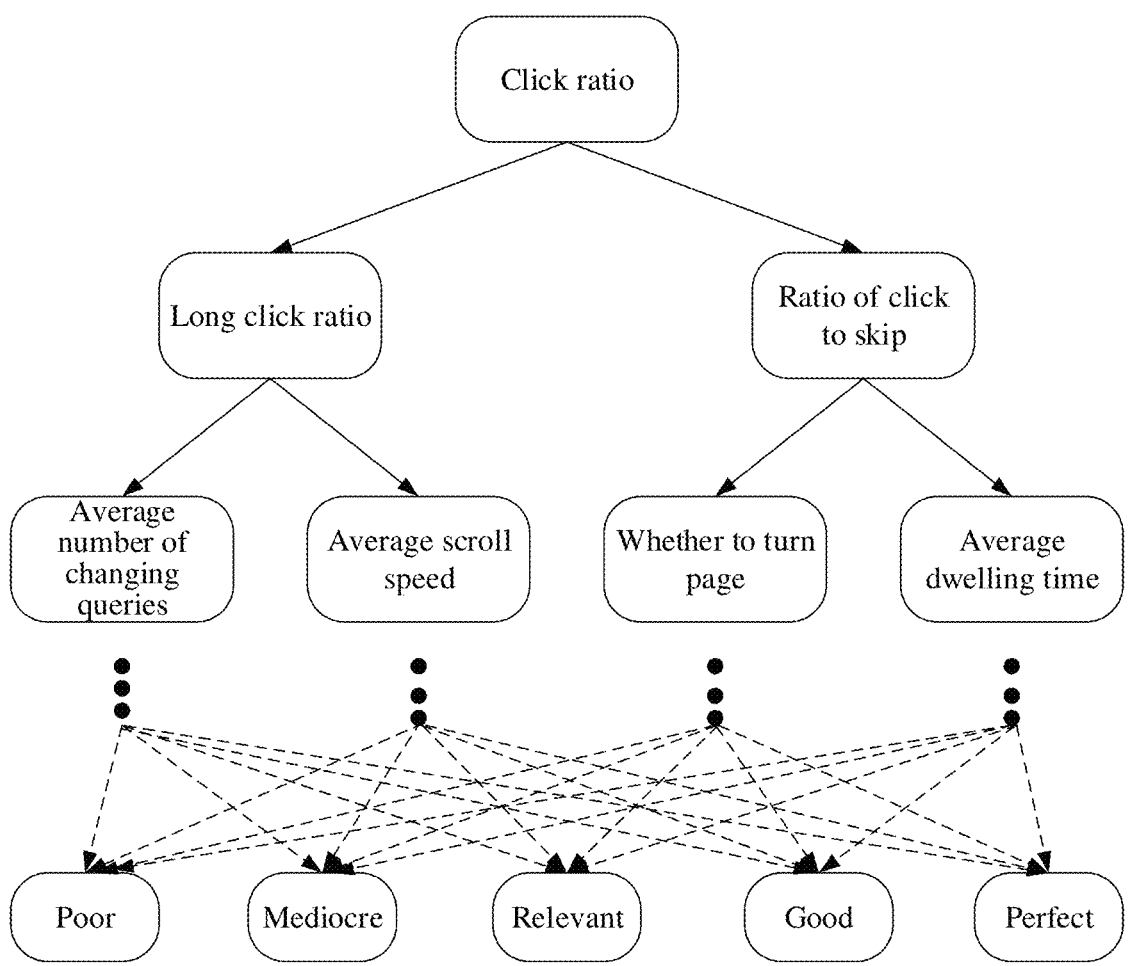
FIG. 2 shows a schematic diagram of a tree model provided by embodiments of the present disclosure.

For example, for the pre-training of the tree model with the relevance score annotation ability, a schematic diagram of a tree model provided by embodiments of the present disclosure is shown in FIG. 2. A user's behavior information may show a click quality of a candidate text to a certain extent, and the click quality may be determined based on a long click ratio and a ratio of click to skip. For example, the long click ratio may be reflected by an average number of times of changing queries and an average scroll speed, and the click to skip may be reflected by whether to turn page and an average dwelling time. These user behaviors may be used to calibrate a noise and a presentation deviation in initial click data, and a level of relevance between the search text and the candidate text in the sample pair may be described as poor, mediocre, relevant, good, or perfect. Therefore, a small number of sample pairs of search text and candidate text with rich user behavior features may be manually labeled firstly, and human preference learning may be performed through the sample pairs of search text and candidate text with rich user behavior features. In view of the small number of sample pairs of search text and candidate text with rich user behavior features, massive unsupervised data may be used to solve problems of small number of sample pairs and inaccurate user behaviors, and a tree model with a relevance score annotation ability may be constructed. Among the user behavior information, the average dwelling time may effectively filter out a candidate text that attracts user's attention through a title, or a click on the candidate text caused by a wrong touch; and the ratio of click to skip may filter out a deviation caused by exposure.

After the plurality of first sample pairs are acquired, a second relevance score corresponding to each first sample pair may be determined by an initial language model, so that at least one network parameter of the initial language model may be updated through the label information and the second relevance score corresponding to each first sample pair.

In S102, for each first sample pair, a first target summary corresponding to a first candidate text in the first sample pair is determined; and the first search text, a first title text of the first candidate text and the first target summary are input into the initial language model to obtain the second relevance score corresponding to the first sample pair.

The first target summary corresponding to the first candidate text may be understood as one or more sentences selected from the first candidate text to replace the first candidate text to participate in the training of the ranking model, and a text length of the first target summary is less than a text length of the first candidate text.

For the determination of the second relevance score corresponding to each first sample pair of the plurality of first sample pairs, as the second relevance score corresponding to each first sample pair is determined in a similar way, an arbitrary first sample pair among the plurality of first sample pairs is taken as an example to describe the determination of the second relevance score corresponding to each first sample pair is described in order to avoid redundant description.

When determining the second relevance score corresponding to any first sample pair, the first search text included in the first sample pair, the first title text of the first candidate text, and the first target summary may be input into the initial language model. The initial language model may be used as an initial language model for training the ranking model. An output of the initial language model is the second relevance score between the first search text and the first candidate text included in the first sample pair, and the second relevance score may be recorded as the second relevance score corresponding to the first sample pair. Based on this method, the second relevance score corresponding to each first sample pair of the plurality of first sample pairs may be obtained.

After determining the second relevance score corresponding to each first sample pair through the initial language model, the at least one network parameter of the initial language model may be updated in combination with the label information corresponding to each first sample pair acquired in S101, that is, S103 is performed.

In S103, the at least one network parameter of the initial language model is updated according to the first relevance score and the second relevance score corresponding to each first sample pair.

It may be understood that S101 to S103 described above are only one training operation of the ranking model. After the at least one network parameter of the initial language model is updated according to the first relevance score and the second relevance score corresponding to each first sample pair, if the updated language model converges, the updated initial language model may be directly determined as the ranking model to be trained; if the updated language model does not converge, S101 to S103 may be continuously performed until the updated language model converges, and the language model corresponding to the convergence may be determined as the ranking model to be trained, so as to obtain the ranking model.

In embodiments of the present disclosure, when training the ranking model based on the initial language model, a plurality of first sample pairs and respective label information for the plurality of first sample pairs may be acquired first; for each first sample pair, a first target summary corresponding to a first candidate text in the first sample pair may be determined; and the first search text, the first title text of the first candidate text, and the first target summary may be input into the initial language model to obtain the second relevance score corresponding to the first sample pair. Then, the first target summary instead of the entire first candidate text participates in the training of the ranking model, and the second relevance score corresponding to each first sample pair is determined based on the first search text, the first title text and the first target summary, then the at least one network parameter of the initial language model is updated according to the first relevance score and the second relevance score corresponding to each first sample pair. Compared with the related art, the consumption of computing resources may be greatly reduced, and the problem of poor performance of the ranking model due to the occupation of a large amount of computing resources may be solved, so that the ranking efficiency of candidate texts may be effectively improved.

Figure 3:
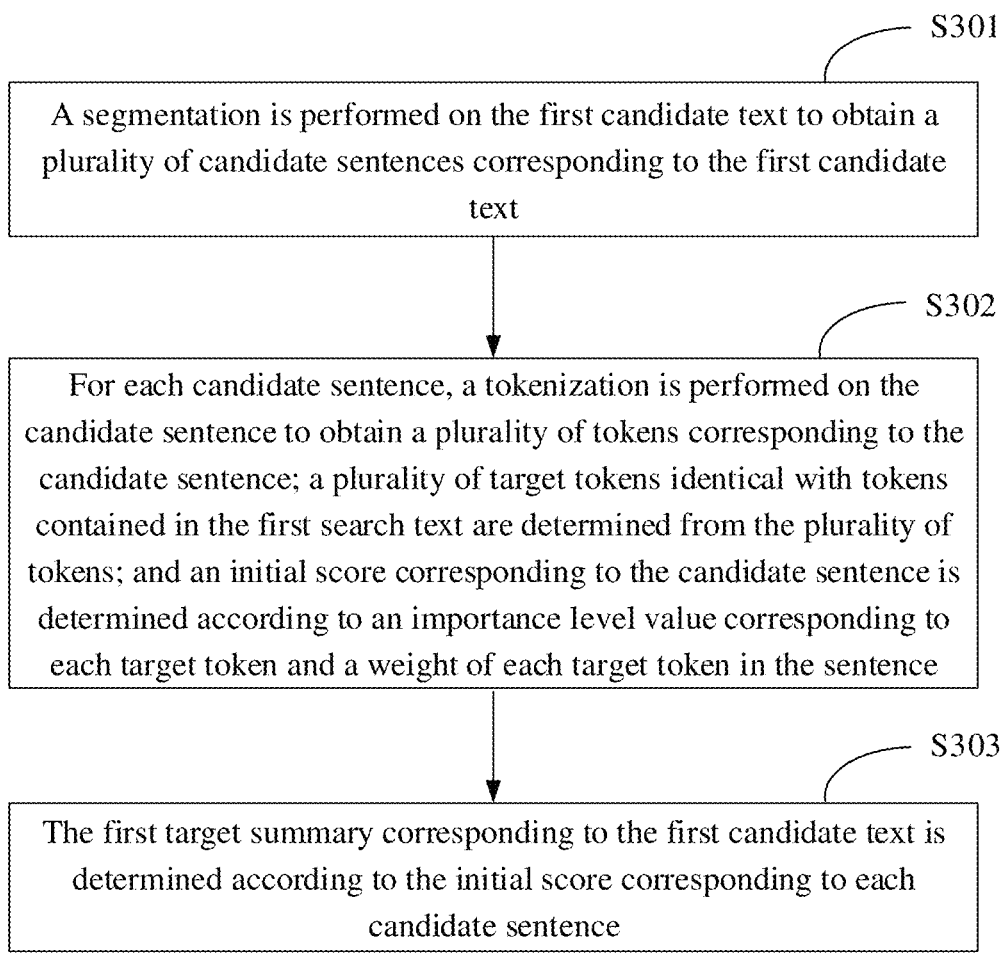
FIG. 3 shows a flowchart of a method of determining a first target summary corresponding to a first candidate text according to a second embodiment of the present disclosure.

Based on the above embodiment shown in FIG. 1, in order to facilitate the understanding of how to determine the first target summary corresponding to the first candidate text in the first sample pair in embodiments of the present disclosure, the following will describe in detail how to determine the first target summary corresponding to the first candidate text in the first sample pair through the embodiment shown in FIG. 3.

Second Embodiment

FIG. 3 shows a flowchart of a method of determining a first target summary corresponding to a first candidate text according to the second embodiment of the present disclosure. The determination method may also be performed by software and/or hardware device, and the hardware device may be, for example, a terminal or a server. For example, as shown in FIG. 3, the method of determining the first target summary corresponding to the first candidate text may include the following steps.

In S301, a segmentation is performed on the first candidate text to obtain a plurality of candidate sentences corresponding to the first candidate text.

For example, when performing the segmentation on the first candidate text, the first candidate text may be segmented according to a predetermined sign to obtain a plurality of candidate sentences corresponding to the first candidate text. For example, the predetermined sign may be a full stop, a semicolon, or other punctuation marks, as long as the segmentation of the text may be performed accurately. Alternatively, an existing text segmentation model may be used to perform the segmentation on the first candidate text to obtain a plurality of candidate sentences corresponding to the first candidate text, which may be set according to actual needs. Here, how to perform the segmentation on the first candidate text is not specifically limited in embodiments of the present disclosure.

In S302, for each candidate sentence, a tokenization is performed on the candidate sentence to obtain a plurality of tokens corresponding to the candidate sentence; a plurality of target tokens identical with tokens contained in the first search text are determined from the plurality of tokens; and an initial score corresponding to the candidate sentence is determined according to an importance level value corresponding to each target token and a weight of each target token in the sentence.

For the determination of the initial score corresponding to each candidate sentence of the plurality of candidate sentences, as the initial score corresponding to each candidate sentence is determined in a similar way, an arbitrary candidate sentence among the plurality of candidate sentences is taken as an example to describe the determination of the initial score corresponding to each candidate sentence in order to avoid redundant description.

When determining the initial score corresponding to any candidate sentence, a tokenization may be performed on the candidate sentence first. The existing tokenization methods may be used for the tokenization, and details will not be described here. A plurality of tokens corresponding to the candidate sentence may be obtained through the tokenization. Then, a plurality of target tokens identical with the tokens contained in the first search text may be selected from the plurality of tokens. It may be understood that in embodiments of the present disclosure, in addition to the tokenization performed on the candidate sentences, a tokenization is further performed on the first search text to obtain a plurality of tokens corresponding to the first search text, and an importance level value corresponding to each of the plurality of tokens corresponding to the first search text is determined based on an importance level dictionary. After the plurality of target tokens corresponding to the candidate sentence are determined, the importance level value corresponding to each target token of the plurality of target tokens may be determined based on the importance level value corresponding to each token corresponding to the first search text, then a product between the importance level value and the weight corresponding to each target token may be calculated, and a sum of the calculated products of the target tokens may be determined as the initial score corresponding to the candidate sentence, so that the initial score corresponding to the candidate sentence is determined.

In S303, the first target summary corresponding to the first candidate text is determined according to the initial score corresponding to each candidate sentence.

For example, two possible implementations may be adopted when determining the first target summary corresponding to the first candidate text according to the initial score corresponding to each candidate sentence.

In one possible implementation, a candidate sentence with a highest initial score is determined as the first target summary corresponding to the first candidate text according to the initial score corresponding to each candidate sentence. By using the candidate sentence with the highest initial score as the first target summary to replace the first candidate text to participate in the training of the ranking model, the computational amount of the ranking model may be greatly reduced, and the consumption of computing resources may be reduced.

In the other possible implementation, the candidate sentence with the highest initial score is determined as a first candidate sentence according to the initial score corresponding to each candidate sentence; the weight of each target token in the sentence is reduced, then a target score corresponding to the candidate sentence is determined according to the importance level value corresponding to each target token and the reduced weight of each target word, and a candidate sentence with a highest target score is determined as a second candidate sentence; and the first candidate sentence and the second candidate sentence are determined as the first target summary corresponding to the first candidate text.

It should be noted that in this possible implementation, after reducing the weight of each target token in the sentence, the method of determining the target score corresponding to the candidate sentence according to the importance level value corresponding to the target token and the reduced weight of the target token is similar to the above-described method of determining the initial score corresponding to the candidate sentence, and details will not be repeated here.

In this possible implementation, by reducing the weight of each target token in the sentence to determine the second candidate sentence, and determining the first candidate sentence and the second candidate sentence as the first target summary corresponding to the first candidate text, the determined first target summary may cover more words in the first search text, so that the first target summary may more fully describe the replaced first candidate text. By using the first target summary to replace the first candidate text to participate in the training of the ranking model, the computational amount of the ranking model may be greatly reduced, and the consumption of computing resources may be reduced.

In combination with S301 to S303 described above, when determining the first target summary corresponding to the first candidate text, reference may be made to the following pseudo code.

```
Require:
    The query q , the document d , the decay factor: α;
    The number of generated query-dependent summaries: k .
Ensure:
    The generated query-dependent summaries: s;
 1:    W_q=Word-Tokenize(q);
 2:    ω_w= Word-Importance(w) for w∈ W_q;
 3:    S=Sentence-Tokenize(d);
 4:    W_{s_i}=Word-Tokenize(s_i) for s_i ∈ S ;
 5:    s,c ←{ },1;
 6:    while c ≤k do
 7:        for all s_i ∈ S do
 8:            Score_{s_i} = Σ_{ω∈ w_0} ω_w with W_0 = W_{s_i} ∩W_q ;
 9:        end for
10:        s_* = argmax_s{Scores_{s_i}|s_i∈S};
11:        s ← s_* + s;
12:        S ← S − s_*;
13:        ω_ω ← α * ω_ω for w∈W_{s_*}∩W_q;
14:        c ← c + 1;
15:    end while
16:    return s ;
``` where Line 1 to Line 4 describe the segmentation performed on the first candidate text and the tokenization performed on the plurality of candidate sentences of the first candidate text; Line 7 to Line 9 describe the determination of the initial score corresponding to the candidate sentence according to the importance level value corresponding to each target token and the weight of each target token in the sentence; Line 10 describes the determination of the candidate sentence with the highest initial score as the first target summary corresponding to the first candidate text; Line 13 describes the reduction of the weight of each target token in the sentence.

In embodiments of the present disclosure, when determining the first target summary, a segmentation may be firstly performed on the first candidate text to obtain a plurality of candidate sentences corresponding to the first candidate text; and the first target summary corresponding to the first candidate text may be determined according to the initial score corresponding to each candidate sentence. By using the first target summary instead of the first candidate text to participate in the training of the ranking model, the computational amount of the ranking model may be greatly reduced, and the consumption of computing resources may be reduced. In this way, in the subsequent training of the ranking model based on the first target summary, the problem of poor performance of the ranking model due to the occupation of a large amount of computing resources may be solved, so that the ranking efficiency of candidate texts may be effectively improved.

Figure 4:
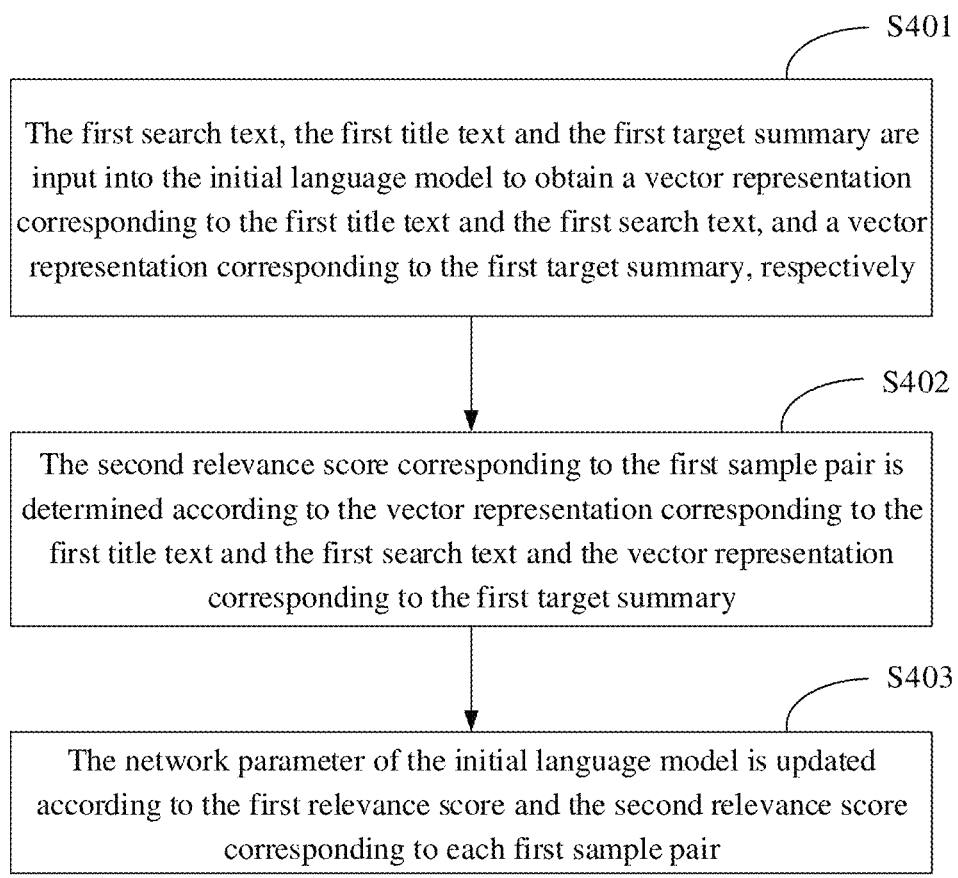
FIG. 4 shows a flowchart of a method of determining a second relevance score corresponding to a first sample pair according to a third embodiment of the present disclosure.

Based on the above embodiments shown in FIG. 1 or FIG. 3, in order to facilitate the understanding of how to obtain the second relevance score between the first search text, the first title text and the first target summary and update the at least one network parameter of the initial language model according to the first relevance score and the second relevance score corresponding to each first sample pair so as to obtain the ranking model in the above embodiments, the following will describe how to obtain the ranking model through a third embodiment shown in FIG. 4.

Third Embodiment

FIG. 4 shows a flowchart of a method of determining a second relevance score corresponding to a first sample pair according to the third embodiment of the present disclosure. The determination method may also be performed by software and/or hardware device, and the hardware device may be, for example, a terminal or a server. For example, as shown in FIG. 4, the method of determining the second relevance score corresponding to the first sample pair may include the following steps.

In S401, the first search text, the first title text and the first target summary are input into the initial language model to obtain a vector representation corresponding to the first title text and the first search text, and a vector representation corresponding to the first target summary, respectively.

Figure 5:
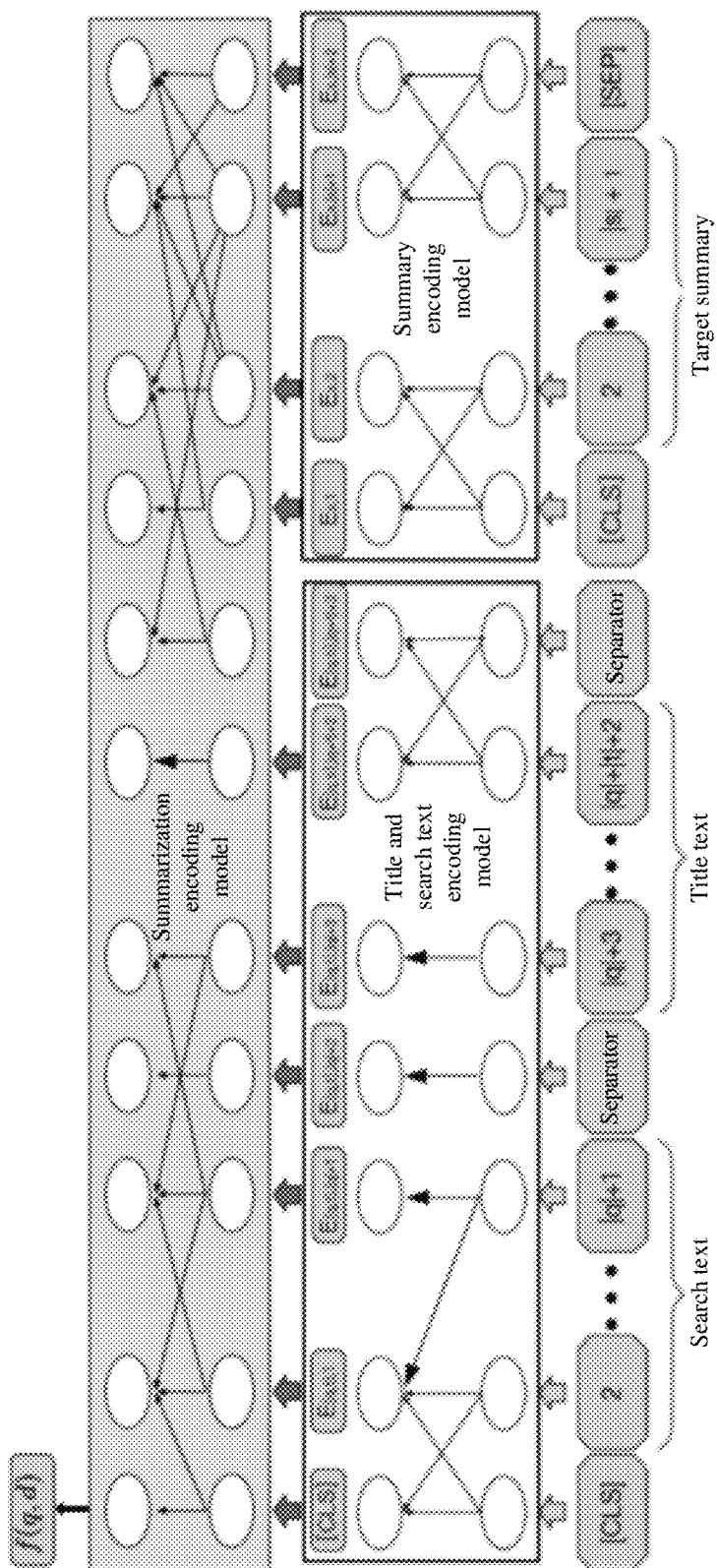
FIG. 5 shows a schematic structural diagram of an initial language model provided by embodiments of the present disclosure.

For example, in embodiments of the present disclosure, the initial language model includes a summary encoding model, and a title and search text encoding model. For example, referring to FIG. 5. FIG. 5 shows a schematic structural diagram of an initial language model provided by embodiments of the present disclosure. The first title text and the first search text may be input into the title and search text encoding model first, and an output of the title and search text encoding model is the vector representation corresponding to the first title text and the first search text, which may be denoted as E*q, t+, where q represents the first title text and t represents the first search text, so as to obtain the vector representation corresponding to the first title text and the first search text. The first target summary may be into the summary encoding model, and an output of the summary encoding model is the vector representation corresponding to the first target summary, which may be denoted as Es, where s represents the first target summary, so as to obtain the vector representation corresponding to the first target summary. It may be understood that in general, before inputting the first title text and the first search text into the title and search text encoding model, it is needed to firstly determine a word vector for the first title text and the first search text, and input the word vector for the first title text and the word vector for the first search text into the title and search text encoding model. Similarly, before inputting the first target summary into the summary encoding model, it is generally needed to determine a word vector for the first target summary, and input the word vector for the first target summary into the summary encoding model.

After the vector representation corresponding to the first title text and the first search text and the vector representation corresponding to the first target summary are obtained respectively, S402 may be performed.

In S402, the second relevance score corresponding to the first sample pair is determined according to the vector representation corresponding to the first title text and the first search text and the vector representation corresponding to the first target summary.

For example, the initial language model further includes a summarization encoding model, as shown in FIG. 5. The vector representation corresponding to the first title text and the first search text and the vector representation corresponding to the first target summary may be input into the summarization encoding model, and an output of the summarization encoding model is the relevance between the first search text and the first candidate text included in the first sample pair, that is, the second relevance score corresponding to the first sample pair. The second relevance score corresponding to the first sample pair is the relevance score corresponding to the first sample pair predicted by the initial language model.

It may be understood that in the above steps S401 and S402, an arbitrary first sample pair among the plurality of first sample pairs is taken as an example to describe how to obtain the second relevance score corresponding to the first sample pair. The method of determining the second relevance score for other first sample pairs is similar to the above, and details will not be described in embodiments of the present disclosure.

In S403, the at least one network parameter of the initial language model is updated according to the first relevance score and the second relevance score corresponding to each first sample pair.

For example, a first loss function corresponding to each first sample pair may be constructed firstly according to the first relevance score and the second relevance score corresponding to each first sample pair. As the plurality of first sample pairs belong to the same batch of sample pairs used for training the ranking model, an average loss function corresponding to the plurality of first sample pairs may be determined according to the first loss function corresponding to each first sample pair, which may be referred to as a first average loss function. Then, the at least one network parameter of the initial language model may be updated according to the first average loss function until the first average loss function converges, and the language model corresponding to the convergence is determined as the ranking model, so that a language model-based ranking model is obtained.

In embodiments of the present disclosure, when obtaining the language model-based ranking model, for each first sample pair, the first search text, the first title text and the first target summary corresponding to any first sample pair may be input into the initial language model to respectively obtain the vector representation corresponding to the first title text and the first search text and the vector representation corresponding to the first target summary; and the second relevance score corresponding to the first sample pair is determined according to the vector representation corresponding to the first title text and the first search text and the vector representation corresponding to the first target summary; then the at least one network parameter of the initial language model is updated according to the first relevance score and the second relevance score corresponding to each first sample pair, so as to obtain the ranking model. Compared with the related art, the performance and the ranking efficiency of the ranking model may be balanced, the consumption of computing resources may be greatly reduced, and the problem of poor performance of the ranking model due to the occupation of large amount of computing resources is solved, so that the ranking efficiency of candidate texts may be effectively improved.

Based on the above embodiments shown in FIG. 1 or FIG. 4, in order to make the relevance score output by the trained ranking model compatible with other components, such as freshness, quality, authority and other modules, the at least one network parameter of the ranking model obtained in the above embodiments may be further optimized in combination with a pointwise idea and a pairwise idea.

For example, when the at least one network parameter of the ranking model obtained in the embodiments shown in FIG. 1 or FIG. 4 is further optimized in combination with the pointwise idea and the pairwise idea, a batch of manually labeled search sample pairs may be additionally acquired, which may be referred to as second sample pairs in embodiments of the present disclosure in order to be distinguished from the first sample pairs shown in the above-mentioned embodiments. Different from the first sample pair shown in the above-mentioned embodiments, the second sample pair here includes one search text and two candidate texts corresponding to the search text. The search text may be referred to as a second search text, and the corresponding two candidate texts may be referred to as a second candidate text and a third candidate text. The at least one network parameter of the ranking model obtained in the embodiments shown in FIG. 1 or FIG. 4 may be further optimized based on the batch of manually labeled second sample pairs, and details are described below in a fourth embodiment shown in FIG. 6.

Fourth Embodiment

Figure 6:
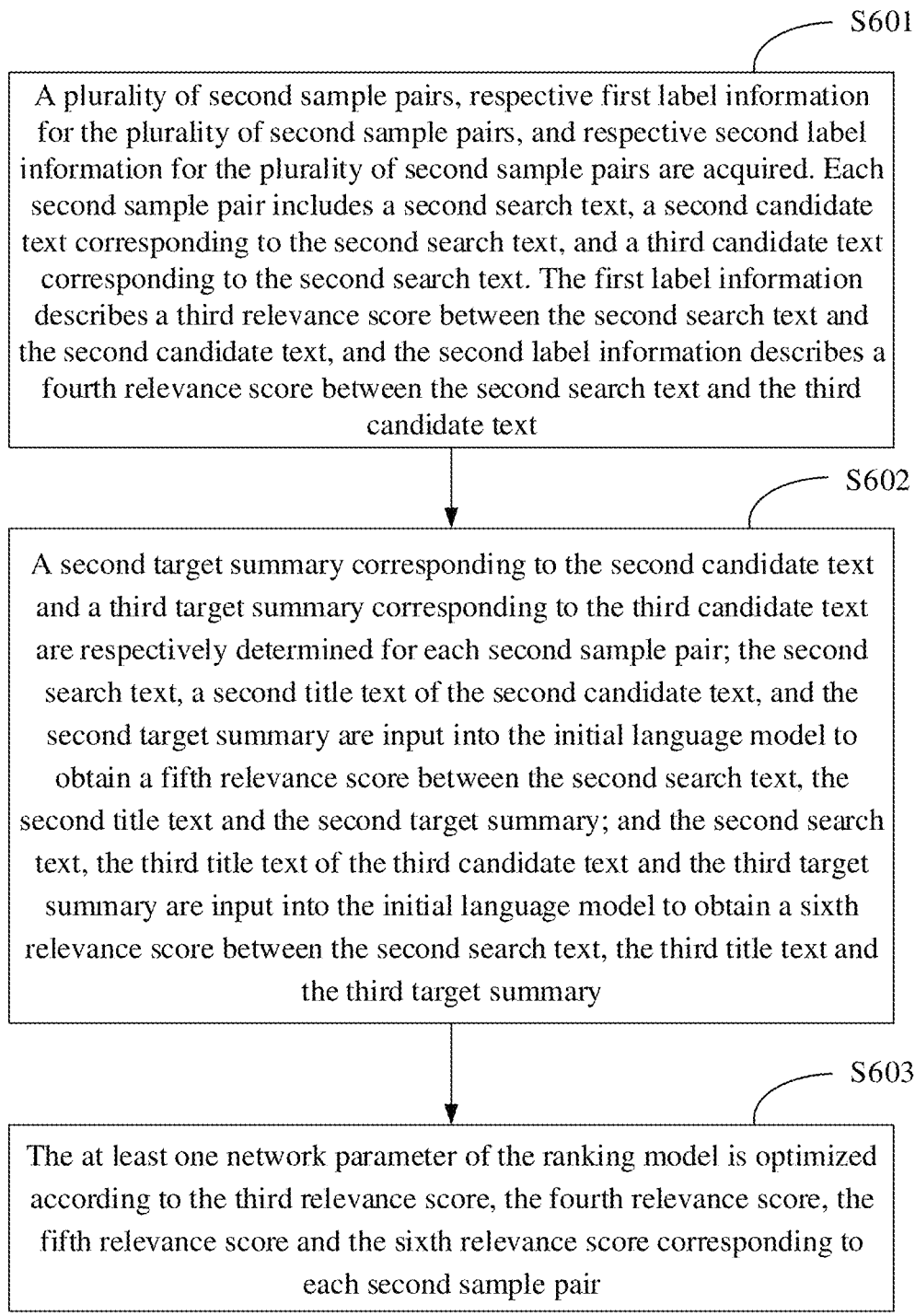
FIG. 6 shows a flowchart of a method of optimizing at least one network parameter of a ranking model according to a fourth embodiment of the present disclosure.

FIG. 6 shows a flowchart of a method of optimizing the at least one network parameter of the ranking model according to the fourth embodiment of the present disclosure. The determination method may also be performed by software and/or hardware device, and the hardware device may be, for example, a terminal or a server. For example, as shown in FIG. 6, the method of optimizing the at least one network parameter of the ranking model may include the following steps.

In S601, a plurality of second sample pairs, respective first label information for the plurality of second sample pairs, and respective second label information for the plurality of second sample pairs are acquired. Each second sample pair includes a second search text, a second candidate text corresponding to the second search text, and a third candidate text corresponding to the second search text. The first label information describes a third relevance score between the second search text and the second candidate text, and the second label information describes a fourth relevance score between the second search text and the third candidate text.

A plurality of candidate texts corresponding to the second search text may be recalled based on the input second search text. Different candidate texts may have different relevant scores to the second search text. In embodiments of the present disclosure, the second candidate text and the third candidate text corresponding to the second search text included in each second sample pair may be any two of a plurality of candidate texts corresponding to the second search text, and is not limited to two candidate texts with highest relevance scores to the second search text, as long as the third relevance score between the second search text and the second candidate text is marked by the corresponding first label information and the fourth relevance score between the second search text and the third candidate text is marked by the corresponding second label information.

For example, when acquiring the plurality of second sample pairs, a plurality of pre-stored second sample pairs may be directly acquired from a database; or a plurality of second sample pairs may be acquired from a third-party training system; or a plurality of second sample pairs may be acquired by other methods, which may be set according to actual needs. Here, the method of acquiring the plurality of second sample pairs is not limited in embodiments of the present disclosure.

In S602, a second target summary corresponding to the second candidate text and a third target summary corresponding to the third candidate text are respectively determined for each second sample pair; the second search text, a second title text of the second candidate text, and the second target summary are input into the initial language model to obtain a fifth relevance score between the second search text, the second title text and the second target summary; and the second search text, the third title text of the third candidate text and the third target summary are input into the initial language model to obtain a sixth relevance score between the second search text, the third title text and the third target summary.

For the determination of the fifth relevance score between the second search text, the second title text and the second target summary and the sixth relevance score between the second search text, the third title text and the third target summary in each second sample pair of the plurality of second sample pairs, as the fifth relevance score between the second search text, the second title text and the second target summary and the sixth relevance score between the second search text, the third title text and the third target summary in each second sample pair is determined in a similar manner, an arbitrary second sample pair among the plurality of second sample pairs is taken as an example to describe how to obtain the fifth relevance score between the second search text, the second title text and the second target summary and the sixth relevance score between the second search text, the third title text and the third target summary in each second sample pair in order to avoid redundant description.

When determining the fifth relevance score between the second search text, the second title text and the second target summary and the sixth relevance score between the second search text, the third title text and the third target summary in any second sample pair, the second target summary corresponding to the second candidate text and the third target summary corresponding to the third candidate text may be determined firstly. It may be understood that in embodiments of the present disclosure, the method of determining the second target summary corresponding to the second candidate text and the third target summary corresponding to the third candidate text is the same as the method of determining the first target summary corresponding to the first candidate text in the above-mentioned embodiments. Reference may be made to the related description of the above-mentioned embodiments, and details will not be described here in embodiments of the present disclosure.

After the second target summary corresponding to the second candidate text and the third target summary corresponding to the third candidate text are determined respectively, the second search text, the second title text of the second candidate text and the second target summary may be input into the initial language model to obtain the fifth relevance score between the second search text, the second title text and the second target summary, and the second search text, the third title text of the third candidate text and the third target summary may be input into the initial language model to obtain the sixth relevance score between the second search text, the third title text and the third target summary. A specific implementation is similar to the implementation in the above-mentioned embodiments in which the first search text, the first title text of the first candidate text and the first target summary are input into the initial language model to obtain the second relevance score corresponding to the first sample pair. Reference may be made to the related description of the above-mentioned embodiments, and details will not be described here in embodiments of the present disclosure.

By S602, the fifth relevance score between the second search text, the second title text and the second target summary and the sixth relevance score between the second search text, the third title text and the third target summary in each second sample pair of the plurality of second sample pairs may be obtained. For convenience of description, the fifth relevance score between the second search text, the second title text and the second target summary and the sixth relevance score between the second search text, the third title text and the third target summary in each second sample pair may be referred to as the fifth relevance score and the sixth relevance score corresponding to each second sample pair, which may be combined with the first label information and the second label information for each second sample pair to optimize the at least one network parameter of the ranking model, that is, the following S603 is performed. The first label information is used to describe the third relevance score between the second search text and the second candidate text, and the second label information is used to describe the fourth relevance score between the second search text and the third candidate text.

In S603, the at least one network parameter of the ranking model is optimized according to the third relevance score, the fourth relevance score, the fifth relevance score and the sixth relevance score corresponding to each second sample pair.

For example, for each second sample pair, a pointwise second loss function may be determined according to the third relevance score and the fifth relevance score corresponding to the each second sample pair, and a pointwise third loss function may be determined according to the fourth relevance score and the sixth relevance score corresponding to the each second sample pair; a pairwise fourth loss function may be determined according to the fifth relevance score and the sixth relevance score corresponding to the each second sample pair; then a loss function corresponding to the each second sample pair is determined according to the second loss function, the third loss function and the fourth loss function corresponding to the each second sample pair, which is specifically shown in the following formula.

$$L(Y_i, Y_j, f(q, d_i), f(q, d_j)) =$$
$$\sum_{Y_i < Y_j} \max(0, f(q, d_i) - f(q, d_j) + \tau) + \alpha(\sigma(f(q, d_i), Y_i) + \sigma(f(q, d_j), Y_j))$$

where L represents the loss function corresponding to the second sample pair; if the third relevance score indicated by the first label information for the second sample pair is lower than the fourth relevance score indicated by the second label information for the second sample pair, then $Y_i$ represents the first label information for the second sample pair, and $Y_j$ represents the second label information for the second sample pair; $f(q, d_i)$ represents the fifth relevance score between the second search text, the second title text and the second target summary predicted by the ranking model, $f(q, d_j)$ represents the sixth relevance score between the second search text, the third title text and the third target summary predicted by the ranking model, $\tau$ represents a hyperparameter, $\alpha$ represents a coefficient, $$\sigma(f(q, d_i), Y_i) = \max\left\{\left[f(q, d_i) - \left(\frac{Y_i}{5} + 0.1\right)\right]^2 - \in, 0\right\},$$
$$\sigma(f(q, d_j), Y_j) = \max\left\{\left[f(q, d_j) - \left(\frac{Y_j}{5} + 0.1\right)\right]^2 - \in, 0\right\},$$

$\in$ represents a parameter.

It may be understood that in the above formula, max(0, f(q, $d_i$)–F(q, $d_j$)+$\tau$) may be understood as determining the pairwise fourth loss function according to the fifth relevance score and the sixth relevance score corresponding to the second sample pair, $\sigma$(f(q, $d_i$), $Y_i$) may be understood as determining the pointwise second loss function according to the third relevance score and the fifth relevance score corresponding to the second sample pair, and $\sigma$(f(q, $d_j$), $Y_j$) may be understood as determining the pointwise third loss function according to the fourth relevance score and the sixth relevance score corresponding to the second sample pair.

In combination with the above formula, the loss functions corresponding to the second sample pairs may be determined respectively. As the plurality of second sample pairs belong to the same batch of sample pairs used to optimize the at least one network parameter of the ranking model, the average loss function corresponding to the plurality of second sample pairs may be determined according to the loss functions corresponding to the second sample pairs, and may be referred to as a second average loss function. Then, the at least one network parameter of the initial language model is updated according to the second average loss function until the second average loss function converges. The language model corresponding to the convergence is determined as the optimized target ranking model, so that a language model-based target ranking model is obtained.

In embodiments of the present disclosure, a plurality of second sample pairs may be acquired firstly, and the at least one network parameter of the ranking model may be optimized according to the third relevance score, the fourth relevance score, the fifth relevance score and the sixth relevance score corresponding to each second sample pair to obtain the optimized target ranking model. In this way, a prediction result of the target ranking model may be anchored in a meaningful range based on fine-tuning of manual anchoring, so that a relevance between a fine-tuning target and an artificial preference is as consistent as possible, thereby effectively improving an interpretability and a stability of the target ranking model, and making the target ranking model better compatible with other components, such as freshness, quality, authority and other modules.

Fifth Embodiment

Figure 7:
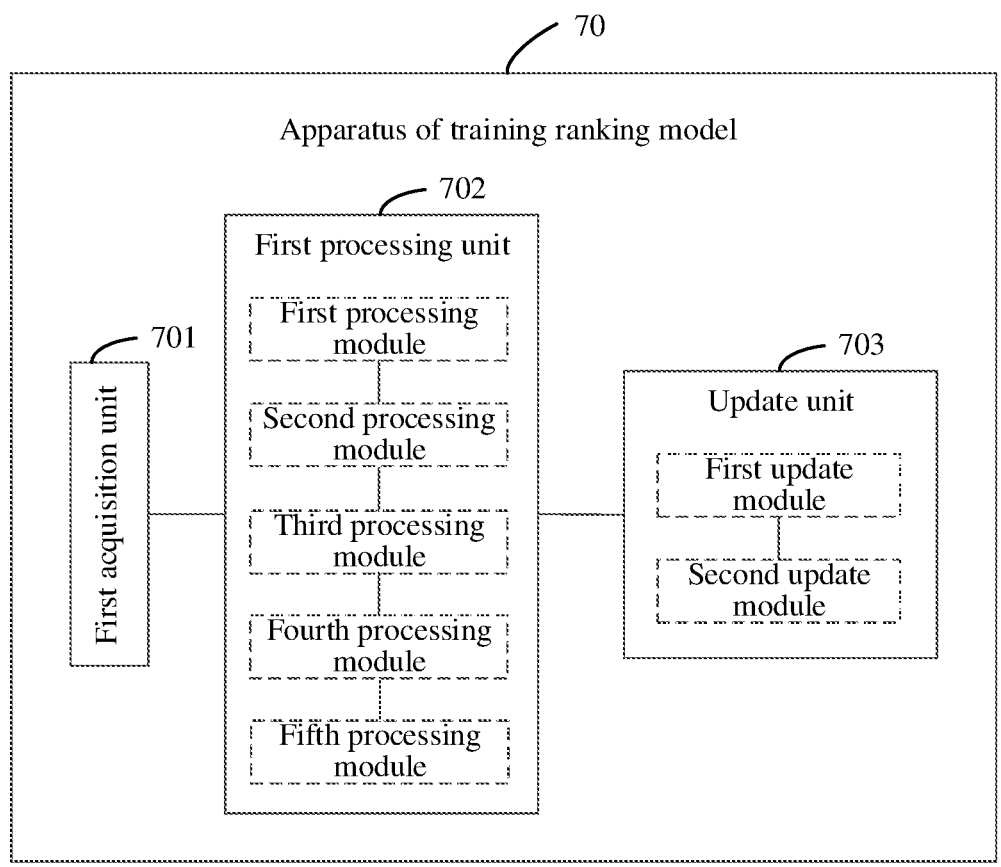
FIG. 7 shows a schematic structural diagram of an apparatus of training a ranking model provided by embodiments of the present disclosure.

FIG. 7 shows a schematic structural diagram of an apparatus 70 of training a ranking model provided by embodiments of the present disclosure. For example, referring to FIG. 7, the apparatus 70 of training the ranking model may include a first acquisition unit 701, a first processing unit 702, and an update unit 703.

The first acquisition unit 701 is used to acquire a plurality of first sample pairs and respective label information for the plurality of first sample pairs. Each of the first sample pairs includes a first search text and a first candidate text corresponding to the first search text, and the label information describes a first relevance score between the first search text and the first candidate text.

The first processing unit 702 is used to determine, for each first sample pair, a first target summary corresponding to the first candidate text in the first sample pair; and input the first search text, a first title text of the first candidate text, and a first target summary into an initial language model to obtain a second relevance score corresponding to the first sample pair.

The update unit 703 is used to update at least one network parameter of the initial language model according to the first relevance score and the second relevance score corresponding to each first sample pair.

Optionally, the first processing unit 702 may include a first processing module and a second processing module.

The first processing module is used to input the first search text, the first title text and the first target summary into the initial language model to obtain a vector representation corresponding to the first title text and the first search text, and a vector representation corresponding to the first target summary, respectively.

The second processing module is used to determine the second relevance score corresponding to the first sample pair according to the vector representation corresponding to the first title text and the first search text and the vector representation corresponding to the first target summary.

Optionally, the initial language model may include a summary encoding model, and a title and search text encoding model; and the first processing module may include a first processing sub-module and a second processing sub-module.

The first processing sub-module is used to input the first title text and the first search text into the title and search text encoding model to obtain the vector representation corresponding to the first title text and the first search text.

The second processing sub-module is used to input the first target summary into the summary encoding model to obtain the vector representation corresponding to the first target summary.

Optionally, the initial language model may further include a summarization encoding model; and the second processing module may include a third processing sub-module.

The third processing sub-module is used to input the vector representation corresponding to the first title text and the first search text and the vector representation corresponding to the first target summary into the summarization encoding model to obtain the second relevance score corresponding to the first sample pair.

Optionally, the first processing unit may further include a third processing module, a fourth processing module, and a fifth processing module.

The third processing module is used to perform a segmentation on the first candidate text to obtain a plurality of candidate sentences corresponding to the first candidate text.

The fourth processing module is used to perform, for each candidate sentence, a tokenization on the candidate sentence to obtain a plurality of tokens corresponding to the candidate sentence; determine a plurality of target tokens identical with tokens contained in the first search text from the plurality of tokens; and determine an initial score corresponding to the candidate sentence according to an importance level value corresponding to each target token and a weight of each target token in the sentence.

The fifth processing module is used to determine the first target summary corresponding to the first candidate text according to the initial score corresponding to each candidate sentence.

Optionally, the fifth processing module may include a fourth processing sub-module and a fifth processing sub-module.

The fourth processing sub-module is used to determine a candidate sentence with a highest initial score as the first target summary corresponding to the first candidate text, according to the initial score corresponding to each candidate sentence; or the fifth processing sub-module is used to determine the candidate sentence with the highest initial score as a first candidate sentence according to the initial score corresponding to each candidate sentence; reduce the weight of each target token in the sentence, determine a target score corresponding to the candidate sentence according to the importance level value corresponding to each target token and the reduced weight of each target token, and determine a candidate sentence with a highest target score as a second candidate sentence; and determine the first candidate sentence and the second candidate sentence as the first target summary corresponding to the first candidate text.

Optionally, the update unit 703 may include a first update module and a second update module.

The first update module is used to construct a first loss function corresponding to each first sample pair according to the first relevance score and the second relevance score corresponding to the each first sample pair.

The second update module is used to update the at least one network parameter of the initial language model according to a first average loss function of the first loss functions corresponding to the first sample pairs until the first average loss function converges, and determine the language model corresponding to the convergence as the ranking model.

Optionally, the apparatus 70 of training the ranking model may further include a second acquisition unit, a second processing unit, and an optimization unit.

The second acquisition unit is used to acquire a plurality of second sample pairs, respective first label information for the plurality of second sample pairs, and respective second label information for the plurality of second sample pairs. Each second sample pair includes a second search text, a second candidate text corresponding to the second search text, and a third candidate text corresponding to the second search text, the first label information is used to describe a third relevance score between the second search text and the second candidate text, and the second label information is used to describe a fourth relevance score between the second search text and the third candidate text.

The second processing unit is used to determine, for each second sample pair, a second target summary corresponding to the second candidate text and a third target summary corresponding to the third candidate text; input the second search text, a second title text of the second candidate text and the second target summary into the initial language model to obtain a fifth relevance score between the second search text, the second title text and the second target summary; and input the second search text, a third title text of the third candidate text and the third target summary into the initial language model to obtain a sixth relevance score between the second search text, the third title text and the third target summary.

The optimization unit is used to optimize the at least one network parameter of the ranking model according to the third relevance score, the fourth relevance score, the fifth relevance score and the sixth relevance score corresponding to each second sample pair.

Optionally, the optimization unit may include a first optimization module, a second optimization module, and a third optimization module.

The first optimization module is used to determine, for each second sample pair, a pointwise second loss function according to the third relevance score and the fifth relevance score corresponding to the each second sample pair, and determine a pointwise third loss function according to the fourth relevance score and the sixth relevance score corresponding to the second sample pair; and determine a pairwise fourth loss function according to the fifth relevance score and the sixth relevance score corresponding to the each second sample pair.

The second optimization module is used to determine a loss function corresponding to each second sample pair according to the second loss function, the third loss function and the fourth loss function corresponding to the each second sample pair.

The third optimization module is used to update the at least one network parameter of the ranking model according to a second average loss function of the loss functions corresponding to the second sample pairs until the second average loss function converges, and determine the ranking model corresponding to the convergence as the target ranking model.

The apparatus 70 of training the ranking model provided in embodiments of the present disclosure may implement the technical solution of the method of training the ranking model shown in any of the above-mentioned embodiments. Its implementation principle and beneficial effects are similar to those of the method of training the ranking model. Reference may be made to the implementation principle and beneficial effects of the method of training the ranking model, which will not be described in detail here.

In the technical solution of the present disclosure, the collection, storage, use, processing, transmission, provision, disclosure, and application of the user's personal information involved are all in compliance with relevant laws and regulations, take essential confidentiality measures, and do not violate public order and good customs. In the technical solution of the present disclosure, authorization or consent is obtained from the user before the user's personal information is obtained or collected.

According to embodiments of the present disclosure, the present disclosure further provides an electronic device and a readable storage medium.

According to embodiments of the present disclosure, the present disclosure further provides a computer program product. The computer program product contains a computer program stored in the readable storage medium. At least one processor of the electronic device may read the computer program from the readable storage medium, and the at least one processor executes the computer program to cause the electronic device to implement the solution provided by any of the above-mentioned embodiments.

Figure 8:
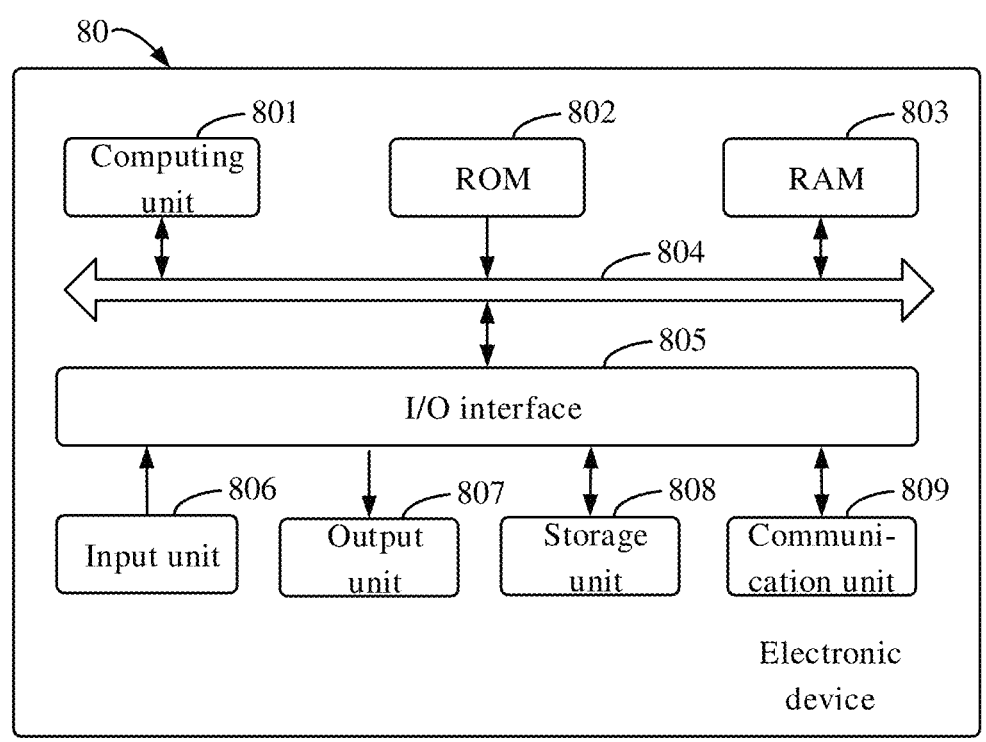
FIG. 8 shows a schematic block diagram of an electronic device provided by embodiments of the present disclosure.

FIG. 8 shows a schematic block diagram of an electronic device 80 provided by embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 8, the electronic device 80 includes a computing unit 801 which may perform various appropriate actions and processes according to a computer program stored in a read only memory (ROM) 802 or a computer program loaded from a storage unit 808 into a random access memory (RAM) 803. In the RAM 803, various programs and data necessary for an operation of the electronic device 80 may also be stored. The computing unit 801, the ROM 802 and the RAM 803 are connected to each other through a bus 804. An input/output (I/O) interface 805 is also connected to the bus 804.

A plurality of components in the electronic device 80 are connected to the I/O interface 805, including: an input unit 806, such as a keyboard, or a mouse; an output unit 807, such as displays or speakers of various types; a storage unit 808, such as a disk, or an optical disc; and a communication unit 809, such as a network card, a modem, or a wireless communication transceiver. The communication unit 809 allows the electronic device 80 to exchange information/data with other devices through a computer network such as Internet and/or various telecommunication networks.

The computing unit 801 may be various general-purpose and/or dedicated processing assemblies having processing and computing capabilities. Some examples of the computing unit 801 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 801 executes various methods and processes described above, such as the method of training the ranking model. For example, in some embodiments, the method of training the ranking model may be implemented as a computer software program which is tangibly embodied in a machine-readable medium, such as the storage unit 808. In some embodiments, the computer program may be partially or entirely loaded and/or installed in the electronic device 80 via the ROM 802 and/or the communication unit 809. The computer program, when loaded in the RAM 803 and executed by the computing unit 801, may execute one or more steps in the method of training the ranking model. Alternatively, in other embodiments, the computing unit 801 may be used to perform the method of training the ranking model by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, also known as a cloud computing server or a cloud host, which is a host product in a cloud computing service system to solve shortcomings of difficult management and weak business scalability existing in a traditional physical host and VPS (Virtual Private Server) service. The server may also be a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of training a ranking model, implemented by one or more processors, the method comprising:
acquiring a plurality of first sample pairs and respective label information for the plurality of first sample pairs, wherein each of the first sample pairs comprises a first search text and a first candidate text corresponding to the first search text, and the label information describes a first relevance score between the first search text and the first candidate text;
for each first sample pair of the plurality of first sample pairs, determining a first target summary corresponding to the first candidate text in the each first sample pair, and inputting the first search text, a first title text of the first candidate text, and the first target summary into an initial language model to obtain a second relevance score corresponding to the each first sample pair; and
updating at least one network parameter of the initial language model according to the first relevance score and the second relevance score corresponding to each first sample pair, the updating comprising:
  constructing a first loss function corresponding to each first sample pair according to the first relevance score and the second relevance score corresponding to the each first sample pair,
  updating the at least one network parameter of the initial language model according to a first average loss function of first loss functions corresponding to the plurality of first sample pairs until the first average loss function converges, and
  determining a language model corresponding to the convergence as the ranking model.

2. The method according to claim 1, wherein the inputting the first search text, a first title text of the first candidate text, and the first target summary into an initial language model to obtain a second relevance score corresponding to the each first sample pair comprises:
  inputting the first search text, the first title text and the first target summary into the initial language model to respectively obtain a vector representation corresponding to the first title text and the first search text, and a vector representation corresponding to the first target summary; and
  determining the second relevance score corresponding to the first sample pair according to the vector representation corresponding to the first title text and the first search text and the vector representation corresponding to the first target summary.

3. The method according to claim 2, wherein the initial language model comprises a summary encoding model, and a title and search text encoding model; and
  wherein the inputting the first search text, the first title text and the first target summary into the initial language model to respectively obtain a vector representation corresponding to the first title text and the first search text, and a vector representation corresponding to the first target summary comprises:
  inputting the first title text and the first search text into the title and search text encoding model to obtain the vector representation corresponding to the first title text and the first search text; and
  inputting the first target summary into the summary encoding model to obtain the vector representation corresponding to the first target summary.

4. The method according to claim 3, wherein the initial language model further comprises a summarization encoding model; and
  wherein the determining the second relevance score corresponding to the first sample pair according to the vector representation corresponding to the first title text and the first search text and the vector representation corresponding to the first target summary comprises inputting the vector representation corresponding to the first title text and the first search text and the vector representation corresponding to the first target summary into the summarization encoding model to obtain the second relevance score corresponding to the first sample pair.

5. The method according to claim 3, wherein the determining a first target summary corresponding to the first candidate text in the each first sample pair comprises:
  performing a segmentation on the first candidate text to obtain a plurality of candidate sentences corresponding to the first candidate text;
  for each candidate sentence, performing a tokenization on the candidate sentence to obtain a plurality of tokens corresponding to the candidate sentence;
  determining, from the plurality of tokens, a plurality of target tokens identical with tokens contained in the first search text; and
  determining an initial score corresponding to the candidate sentence according to an importance level value corresponding to each target token and a weight of the each target token in the sentence; and
  determining the first target summary corresponding to the first candidate text according to the initial score corresponding to each candidate sentence.

6. The method according to claim 2, wherein the initial language model further comprises a summarization encoding model; and
  wherein the determining the second relevance score corresponding to the first sample pair according to the vector representation corresponding to the first title text and the first search text and the vector representation corresponding to the first target summary comprises inputting the vector representation corresponding to the first title text and the first search text and the vector representation corresponding to the first target summary into the summarization encoding model to obtain the second relevance score corresponding to the first sample pair.

7. The method according to claim 6, wherein the determining a first target summary corresponding to the first candidate text in the each first sample pair comprises:
  performing a segmentation on the first candidate text to obtain a plurality of candidate sentences corresponding to the first candidate text;
  for each candidate sentence, performing a tokenization on the candidate sentence to obtain a plurality of tokens corresponding to the candidate sentence; determining, from the plurality of tokens, a plurality of target tokens identical with tokens contained in the first search text; and determining an initial score corresponding to the candidate sentence according to an importance level value corresponding to each target token and a weight of the each target token in the sentence; and
  determining the first target summary corresponding to the first candidate text according to the initial score corresponding to each candidate sentence.

8. The method according to claim 2, wherein the determining a first target summary corresponding to the first candidate text in the each first sample pair comprises:
  performing a segmentation on the first candidate text to obtain a plurality of candidate sentences corresponding to the first candidate text;
  for each candidate sentence, performing a tokenization on the candidate sentence to obtain a plurality of tokens corresponding to the candidate sentence;
  determining, from the plurality of tokens, a plurality of target tokens identical with tokens contained in the first search text; and
  determining an initial score corresponding to the candidate sentence according to an importance level value corresponding to each target token and a weight of the each target token in the sentence; and
  determining the first target summary corresponding to the first candidate text according to the initial score corresponding to each candidate sentence.

9. The method according to claim 1, wherein the determining a first target summary corresponding to the first candidate text in the each first sample pair comprises:

performing a segmentation on the first candidate text to obtain a plurality of candidate sentences corresponding to the first candidate text;

for each candidate sentence, performing a tokenization on the candidate sentence to obtain a plurality of tokens corresponding to the candidate sentence;

determining, from the plurality of tokens, a plurality of target tokens identical with tokens contained in the first search text;

determining an initial score corresponding to the candidate sentence according to an importance level value corresponding to each target token and a weight of the each target token in the sentence; and determining the first target summary corresponding to the first candidate text according to the initial score corresponding to each candidate sentence.

10. The method according to claim 9, wherein the determining the first target summary corresponding to the first candidate text according to the initial score corresponding to each candidate sentence comprises:

determining, according to the initial score corresponding to each candidate sentence, a candidate sentence with a highest initial score as the first target summary corresponding to the first candidate text; or determining, according to the initial score corresponding to each candidate sentence, a candidate sentence with a highest initial score as a first candidate sentence, reducing the weight of each target token in the sentence, determining a target score corresponding to the candidate sentence according to the importance level value corresponding to the each target token and the reduced weight of the each target word, and determining a candidate sentence with a highest target score as a second candidate sentence, and determining the first candidate sentence and the second candidate sentence as the first target summary corresponding to the first candidate text.

11. The method according to claim 1, further comprising:

acquiring a plurality of second sample pairs, respective first label information for the plurality of second sample pairs, and respective second label information for the plurality of second sample pairs, wherein each second sample pair comprises a second search text, a second candidate text corresponding to the second search text, and a third candidate text corresponding to the second search text, the first label information describes a third relevance score between the second search text and the second candidate text, and the second label information describes a fourth relevance score between the second search text and the third candidate text;

for each second sample pair of the plurality of second sample pairs, determining a second target summary corresponding to the second candidate text and a third target summary corresponding to the third candidate text; inputting the second search text, a second title text of the second candidate text, and the second target summary into the initial language model to obtain a fifth relevance score between the second search text, the second title text and the second target summary; inputting the second search text, a third title text of the third candidate text, and the third target summary into the initial language model to obtain a sixth relevance score between the second search text, the third title text and the third target summary; and optimizing the at least one network parameter of the ranking model according to the third relevance score, the fourth relevance score, the fifth relevance score and the sixth relevance score corresponding to each second sample pair.

12. The method according to claim 11, wherein the optimizing the at least one network parameter of the ranking model according to the third relevance score, the fourth relevance score, the fifth relevance score and the sixth relevance score corresponding to each second sample pair comprises:

for each second sample pair, determining a pointwise second loss function according to the third relevance score and the fifth relevance score corresponding to the each second sample pair, determining a pointwise third loss function according to the fourth relevance score and the sixth relevance score corresponding to the each second sample pair, and determining a pairwise fourth loss function according to the fifth relevance score and the sixth relevance score corresponding to the each second sample pair;

determining a loss function corresponding to each second sample pair according to the second loss function, the third loss function and the fourth loss function corresponding to the each second sample pair; and updating the at least one network parameter of the ranking model according to a second average loss function of the loss functions corresponding to the plurality of second sample pairs until the second average loss function converges, and determining a ranking model corresponding to the convergence as a target ranking model.

13. An electronic device, comprising:

at least one processor; and a memory communicatively connected to the at least one processor, wherein the memory stores instructions executable by the at least one processor, and the instructions, when executed by the at least one processor, cause the at least one processor to at least:

acquire a plurality of first sample pairs and respective label information for the plurality of first sample pairs, wherein each of the first sample pairs comprises a first search text and a first candidate text corresponding to the first search text, and the label information describes a first relevance score between the first search text and the first candidate text;

for each first sample pair of the plurality of first sample pairs, determine a first target summary corresponding to the first candidate text in the each first sample pair, and input the first search text, a first title text of the first candidate text, and the first target summary into an initial language model to obtain a second relevance score corresponding to the each first sample pair; and update at least one network parameter of the initial language model according to the first relevance score and the second relevance score corresponding to each first sample pair, the update comprising:

construction of a first loss function corresponding to each first sample pair according to the first relevance score and the second relevance score corresponding to the each first sample pair, update of the at least one network parameter of the initial language model according to a first average loss function of first loss functions corresponding to the plurality of first sample pairs until the first average loss function converges, and determination of a language model corresponding to the convergence as the ranking model.

14. A non-transitory computer-readable storage medium having computer instructions therein, wherein the computer instructions are configured to cause a computer system to at least:

acquire a plurality of first sample pairs and respective label information for the plurality of first sample pairs, wherein each of the first sample pairs comprises a first search text and a first candidate text corresponding to the first search text, and the label information describes a first relevance score between the first search text and the first candidate text;

for each first sample pair of the plurality of first sample pairs, determine a first target summary corresponding to the first candidate text in the each first sample pair, and input the first search text, a first title text of the first candidate text, and the first target summary into an initial language model to obtain a second relevance score corresponding to the each first sample pair; and update at least one network parameter of the initial language model according to the first relevance score and the second relevance score corresponding to each first sample pair, the update comprising:

construction of a first loss function corresponding to each first sample pair according to the first relevance score and the second relevance score corresponding to the each first sample pair, update of the at least one network parameter of the initial language model according to a first average loss function of first loss functions corresponding to the plurality of first sample pairs until the first average loss function converges, and determination of a language model corresponding to the convergence as the ranking model.

15. The medium according to claim 14, wherein the instructions configured to cause the computer system to input the first search text, the first title text of the first candidate text, and the first target summary into the initial language model are further configured to cause the computer system to:

input the first search text, the first title text and the first target summary into the initial language model to respectively obtain a vector representation corresponding to the first title text and the first search text, and a vector representation corresponding to the first target summary; and determine the second relevance score corresponding to the first sample pair according to the vector representation corresponding to the first title text and the first search text and the vector representation corresponding to the first target summary.

16. The medium according to claim 15, wherein the initial language model comprises a summary encoding model, and a title and search text encoding model; and wherein the instructions configured to cause the computer system to input the first search text, the first title text of the first candidate text, and the first target summary into the initial language model are further configured to cause the computer system to:

input the first title text and the first search text into the title and search text encoding model to obtain the vector representation corresponding to the first title text and the first search text; and input the first target summary into the summary encoding model to obtain the vector representation corresponding to the first target summary.

17. The medium according to claim 15, wherein the initial language model further comprises a summarization encoding model; and wherein the instructions configured to cause the computer system to determine the second relevance score corresponding to the first sample pair according to the vector representation corresponding to the first title text and the first search text and the vector representation corresponding to the first target summary are further configured to cause the computer system to input the vector representation corresponding to the first title text and the first search text and the vector representation corresponding to the first target summary into the summarization encoding model to obtain the second relevance score corresponding to the first sample pair.

18. The medium according to claim 14, wherein the instructions configured to cause the computer system to determine the first target summary corresponding to the first candidate text in the each first sample pair are further configured to cause the computer system to:

perform a segmentation on the first candidate text to obtain a plurality of candidate sentences corresponding to the first candidate text;

for each candidate sentence, perform a tokenization on the candidate sentence to obtain a plurality of tokens corresponding to the candidate sentence;

determine, from the plurality of tokens, a plurality of target tokens identical with tokens contained in the first search text;

determine an initial score corresponding to the candidate sentence according to an importance level value corresponding to each target token and a weight of the each target token in the sentence; and determine the first target summary corresponding to the first candidate text according to the initial score corresponding to each candidate sentence.

19. The medium according to claim 18, wherein the instructions configured to cause the computer system to determine the first target summary corresponding to the first candidate text according to the initial score corresponding to each candidate sentence are further configured to cause the computer system to:

determine, according to the initial score corresponding to each candidate sentence, a candidate sentence with a highest initial score as the first target summary corresponding to the first candidate text; or determine, according to the initial score corresponding to each candidate sentence, a candidate sentence with a highest initial score as a first candidate sentence, reduce the weight of each target token in the sentence, determine a target score corresponding to the candidate sentence according to the importance level value corresponding to the each target token and the reduced weight of the each target word, determine a candidate sentence with a highest target score as a second candidate sentence, and determine the first candidate sentence and the second candidate sentence as the first target summary corresponding to the first candidate text.

20. The medium according to claim 14, wherein the instructions are further configured to cause the computer system to:

acquire a plurality of second sample pairs, respective first label information for the plurality of second sample pairs, and respective second label information for the plurality of second sample pairs, wherein each second sample pair comprises a second search text, a second candidate text corresponding to the second search text, and a third candidate text corresponding to the second search text, the first label information describes a third relevance score between the second search text and the second candidate text, and the second label information describes a fourth relevance score between the second search text and the third candidate text;

for each second sample pair of the plurality of second sample pairs, determine a second target summary corresponding to the second candidate text and a third target summary corresponding to the third candidate text;

input the second search text, a second title text of the second candidate text, and the second target summary into the initial language model to obtain a fifth relevance score between the second search text, the second title text and the second target summary;

input the second search text, a third title text of the third candidate text, and the third target summary into the initial language model to obtain a sixth relevance score between the second search text, the third title text and the third target summary; and optimize the at least one network parameter of the ranking model according to the third relevance score, the fourth relevance score, the fifth relevance score and the sixth relevance score corresponding to each second sample pair.

\* \* \* \* \*